United States Patent
Nishitani

(10) Patent No.: US 8,315,011 B2
(45) Date of Patent: Nov. 20, 2012

(54) DISK DRIVE DEVICE IMPROVED IN STIFFNESS OF FLUID DYNAMIC BEARING

(75) Inventor: Yuji Nishitani, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 272 days.

(21) Appl. No.: 12/769,559

(22) Filed: Apr. 28, 2010

(65) Prior Publication Data

US 2010/0302673 A1    Dec. 2, 2010

(30) Foreign Application Priority Data

Jun. 2, 2009    (JP) ................... 2009-133407

(51) Int. Cl.
*G11B 17/02* (2006.01)
*H02K 5/16* (2006.01)

(52) U.S. Cl. ..................... 360/99.08; 310/90
(58) Field of Classification Search ............... 360/98.07, 360/99.04, 99.08
See application file for complete search history.

(56) References Cited

U.S. PATENT DOCUMENTS

| | | | | |
|---|---|---|---|---|
| 5,653,540 A * | 8/1997 | Heine et al. | ................... | 384/123 |
| 5,877,918 A * | 3/1999 | Katakura et al. | ............ | 360/99.08 |
| 6,069,767 A * | 5/2000 | Khan et al. | ................. | 360/99.08 |
| 6,154,339 A * | 11/2000 | Grantz et al. | ............. | 360/99.08 |
| 6,292,328 B1 * | 9/2001 | Rahman et al. | ............ | 360/99.08 |
| 6,375,357 B2 * | 4/2002 | Miura et al. | .................. | 384/100 |
| 6,793,394 B2 * | 9/2004 | Gomyo et al. | ................ | 384/100 |
| 6,828,709 B2 * | 12/2004 | Grantz et al. | .................. | 310/90 |
| 6,943,985 B2 * | 9/2005 | Kull et al. | .................. | 360/99.08 |
| 6,980,394 B2 * | 12/2005 | Inoue et al. | ................. | 360/99.08 |
| 6,998,745 B2 * | 2/2006 | Horiuchi et al. | ............... | 310/90 |
| 7,101,084 B2 * | 9/2006 | Gomyo | ......................... | 384/107 |
| 7,201,517 B2 * | 4/2007 | Gomyo et al. | ................ | 384/107 |
| 7,262,935 B2 * | 8/2007 | LeBlanc | .................... | 360/99.08 |
| 7,608,958 B2 * | 10/2009 | Yajima | ........................... | 310/90 |
| 2004/0032175 A1 * | 2/2004 | Grantz et al. | .................. | 310/90 |
| 2005/0162027 A1 * | 7/2005 | Aiello et al. | ................... | 310/90 |
| 2007/0001531 A1 * | 1/2007 | Nagai | ....................... | 310/156.04 |
| 2009/0021859 A1 * | 1/2009 | Martin | ....................... | 360/99.08 |

FOREIGN PATENT DOCUMENTS

JP    2000-304052    10/2000

* cited by examiner

*Primary Examiner* — Brian Miller
(74) *Attorney, Agent, or Firm* — Fulwider Patton LLP

(57) ABSTRACT

A disk drive device includes a bearing unit and a drive unit. The bearing unit includes: a shaft; a sleeve configured to allow relative rotation, with the shaft as the axis; a flange projected in the radial direction of the shaft and configured to rotate integrally with the shaft; a flange housing space portion provided continuously from the sleeve and configured to rotatably house the flange; a counter plate structured with both a first surface, which faces the end surface in the axial direction of the flange and seals the flange housing space portion, and a second surface that is opposite to the first surface. The projected dimension of the flange is designed to be larger than the wall thickness of the flange surrounding wall portion in the radial direction of the flange, the flange surrounding wall portion defining the flange housing space portion.

17 Claims, 6 Drawing Sheets

DISK DRIVE DEVICE IMPROVED IN STIFFNESS OF FLUID DYNAMIC BEARING

CROSS-REFERENCE TO RELATED APPLICATION

This application is based upon and claims the benefit of priority from the prior Japanese Patent Application No. 2009-133407, filed on Jun. 2, 2009, the entire content of which is incorporated herein by reference.

BACKGROUND OF THE INVENTION

1. Field of the Invention

The present invention relates to a disk drive device, in particular, to a disk drive device improved in the stiffness of a fluid dynamic bearing while suppressing an increase in the size and deterioration in the drive performance of the fluid dynamic bearing.

2. Description of the Related Art

Hard disk drives (HDDs) are media used in storage devices of computers, etc. Devices that drive such recording disks are collectively termed disk drive devices. A disk drive device rotates, at high speed, a recording disk on which recording tracks for recording magnetic data are formed by a brushless motor. A magnetic head, which executes read/write of magnetic data from/in a recording disk, is arranged, with a slight gap, above the recording surface of the recording disk so that the recording tracks are traced.

In many cases, fluid dynamic bearings are used in the bearing units of such disk drive devices. The general structure of a fluid dynamic bearing is disclosed in, for example, Japanese Patent Application Publication No. 2000-304052. The fluid dynamic bearing is provided with dynamic pressure grooves in part of a rotating body, such as a shaft, so that dynamic pressure is generated by interaction with the lubricant, such as oil, which is filled around the rotating body, when the rotating body is rotating. The bearing supports a load by making the rotating body in the lubricant maintain in a non-contact state by spacing the rotating body apart from surrounding components with the use of the generated dynamic pressure.

The rotational accuracy of a disk drive device has been drastically improved by providing such a fluid dynamic bearing, thereby allowing for a larger volume of magnetic data to be stored in a higher density. As a result, disk drive devices, which are provided with fluid dynamic bearings, have been mounted in various apparatuses and used in extensive environments. For example, the disk drive devices have more often been mounted in mobile devices. Under such situations of use, it has been requested that a disk drive device attains a stable rotational drive and is capable of normally executing the reading/writing of magnetic data, even if an impact and so forth is applied to the disk drive device or apparatus in which the disk drive devices is mounted. In particular, for disk drive devices that are mounted in mobile devices, there is a tendency that impact resistance is considered to be important.

The present inventors have recognized that, in a disk drive device, it is desirable that a thrust position of the recording disk is designed not to vary in order to stably maintain the operations of the disk drive device even if an impact is applied thereto in the thrust direction. That is, the inventors have recognized that it is effective to enhance the stiffness in the thrust direction of a fluid dynamic bearing. For example, a disk drive device is taken into consideration, in which the disk drive device comprises: a flange that is fixed to a shaft for rotating a recording disk; and a sleeve that includes a flange housing portion that rotatably houses the flange and that houses the shaft. In this case, because the flange has a function of generating dynamic pressure in the thrust direction, the stiffness in the thrust direction can be improved when the diameter of the flange is increased. However, in a disk drive device that is strongly needed to be small in size, it is undesirable that the housing, which forms the shape of the disk drive device, is made larger. Therefore, making the diameter of the flange larger induces the arrangement space of the drive unit to be compressed, the drive unit being arranged on the outer circumference side of the flange. If the drive unit becomes small, the drive current for generating required torque is increased, thereby causing the required performance of the electronic device, in which the disk drive device is mounted, sometimes not to be fulfilled. Alternatively, when the drive current is not increased, the maximum torque is decreased and the rotation becomes unstable accordingly, thereby sometimes deteriorating the accuracy of the reading/writing of magnetic data.

SUMMARY OF THE INVENTION

The present invention has been made to solve the aforementioned problems, and a purpose of the invention is to provide a disk drive device that has a structure in which the stiffness of a fluid dynamic bearing can be improved while suppressing an increase in size and deterioration in the drive performance.

In order to solve the aforementioned problems, a disk drive device according to an embodiment of the present invention comprises: a base member; a bearing unit arranged on the base member and configured to rotatably support a recording disk relative to the base member; and a drive unit configured to rotationally drive the recording disk to be supported by the bearing unit. The bearing unit includes: a shaft to be the center of the rotation; a sleeve having a housing portion for housing the shaft and configured to allow relative rotation, with the shaft as the axis; a radial space portion defined by both the inner wall surface of the housing portion of the sleeve and the outer wall surface of the shaft; a radial dynamic pressure groove formed on at least one of the inner wall surface of the sleeve and the outer wall surface of the shaft, the two wall surfaces defining the radial space portion; a flange projected in the radial direction of the shaft and configured to rotate integrally with the shaft; a flange housing space portion defined by the flange surrounding wall portion and configured to rotatably house the flange, the flange surrounding wall portion being formed continuously from the sleeve and outwards in the radial direction of the flange; a counter plate structured with both a first surface, which faces the end surface in the axial direction of the flange and seals the flange housing space portion, and a second surface that is opposite to the first surface; a thrust dynamic pressure groove formed on both at least one of the surfaces of the flange and the flange housing space portion, which face each other in the thrust direction, and at least one of the surfaces of the flange and the first surface of the counter plate, and configured to generate thrust dynamic pressure; and lubricant that is filled in the radial space portion and the flange housing space portion. The projected dimension of the flange is designed to be larger than the wall thickness of the flange surrounding wall portion in the radial direction of the flange.

The projected dimension of the flange refers to the dimension of the portion that is projected outwards in the radial direction of the shaft. As the projected dimension becomes larger, the number of the thrust dynamic pressure grooves for generating thrust dynamic pressure can be increased, thereby allowing for the thrust dynamic pressure to be increased. That is, the thrust dynamic pressure can be increased without affecting the dimension of the sleeve and while avoiding an increase in size, by increasing the projected dimension of the flange, which is directly associated with the generation of the thrust dynamic pressure, while reducing the wall thickness of the flange surrounding wall portion that defines the flange housing space portion, which is not directly associated with the generation of the thrust dynamic pressure. Further, it can be suppressed that the arrangement space of the drive unit will become small, the arrangement space being located on the outer circumference side of the sleeve. As a result, the stiffness of a fluid dynamic bearing can be improved while suppressing an increase in size and deterioration in drive performance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Hereinafter, the preferred embodiments of the present invention will be described based on the accompanying drawings. The present embodiment is used in a brushless motor, which is mounted in a hard disk drive device (also simply referred to as an HDD or disk drive device) to drive a recording disk, and in a disk drive motor, etc., which is mounted in an optical disk recording and reproducing device (also simply referred to as a disk drive device), such as CD (Compact Disc) device or DVD (Digital Versatile Disc) device.

Figure 1:
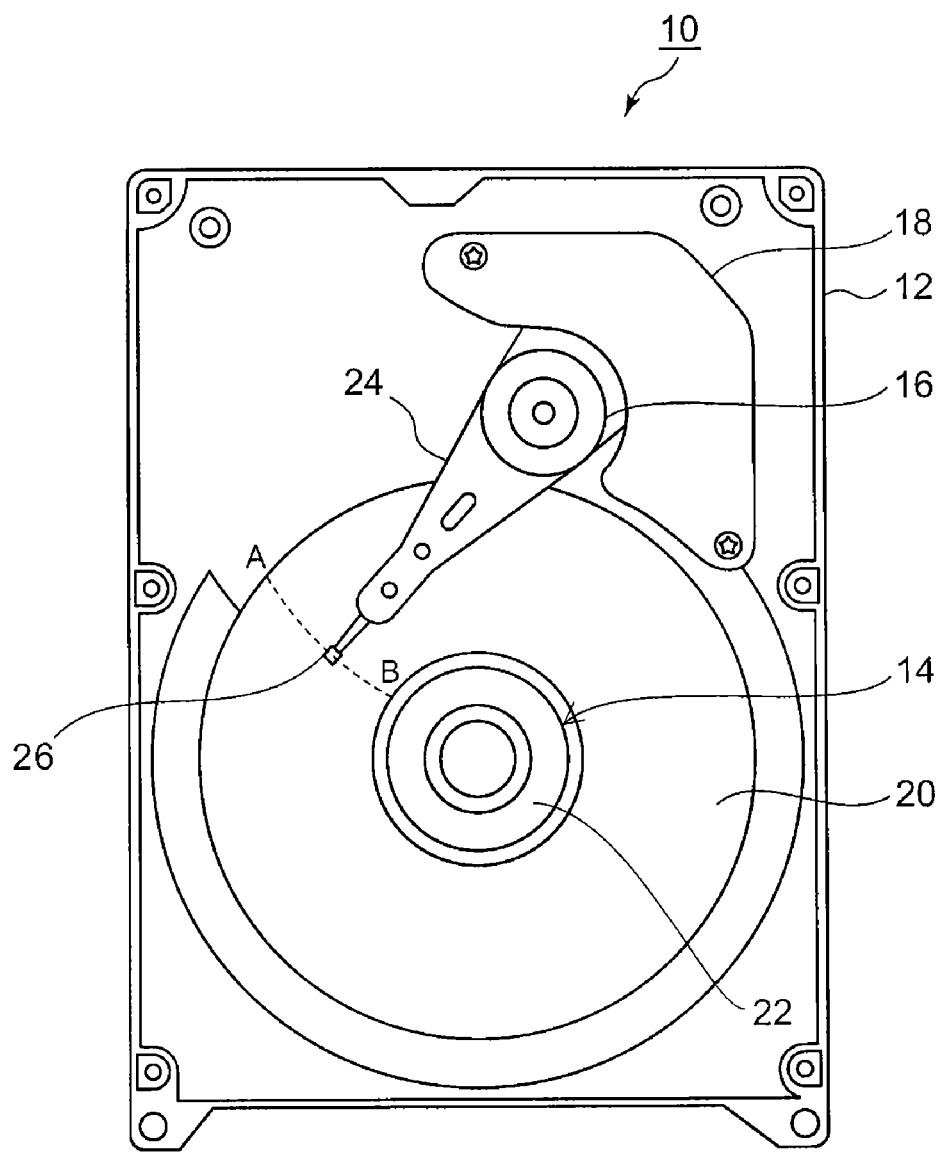
FIG. 1 is an illustrative view illustrating the internal structure of an HDD, an example of a disk drive device according to the present embodiment.

FIG. 1 is an illustrative view illustrating the internal structure of an HDD 10 (hereinafter, simply referred to as a disk drive device 10), an example of a disk drive device according to the present embodiment. FIG. 1 illustrates the state where the cover is removed to expose the internal structure.

A brushless motor 14, an arm bearing unit 16, and a voice coil motor 18, etc., are mounted on the upper surface of a base member 12. The brushless motor 14 supports, on the rotational axis, a hub member 22 for mounting a recording disk 20. For example, the brushless motor 14 rotationally drives the recording disk 20 on which data can be recorded magnetically. The brushless motor 14 may be replaced by, for example, a spindle motor. The brushless motor 14 is driven by a three-phase drive current consisting of a U-phase, a V-phase, and a W-phase. The arm bearing unit 16 supports, in a sing-free manner, a swing arm 24 within a movable range AB. The voice coil motor 18 makes the swing arm 24 swing in accordance with external control data. A magnetic head 26 is fixed to the tip of the swing arm 24. When the disk drive device 10 is in a state of operation, the magnetic head 26 moves, following a swing of the swing arm 24, above the surface of the recording disk 20 with a slight gap between them and within the movable range AB, thereby reading/writing data. In FIG. 1, point A corresponds to the position of the outermost circumferential recording track of the recording disk 20, and point B corresponds to the position of the innermost circumferential recording track thereof. The swing arm 24 may be moved to the waiting position, provided in the side of the recording disk 20, when the disk drive device 10 is in a stopped state.

In the present embodiment, the structure, including all of the components for reading/writing data such as the recording disk 20, the swing arm 24, the magnetic head 26, and the voice coil motor 18, is sometimes expressed as a disk drive device or sometimes as an HDD. Or, only the components for rotationally driving the recording disk 20 are sometimes expressed as a disk drive device.

Figure 2:
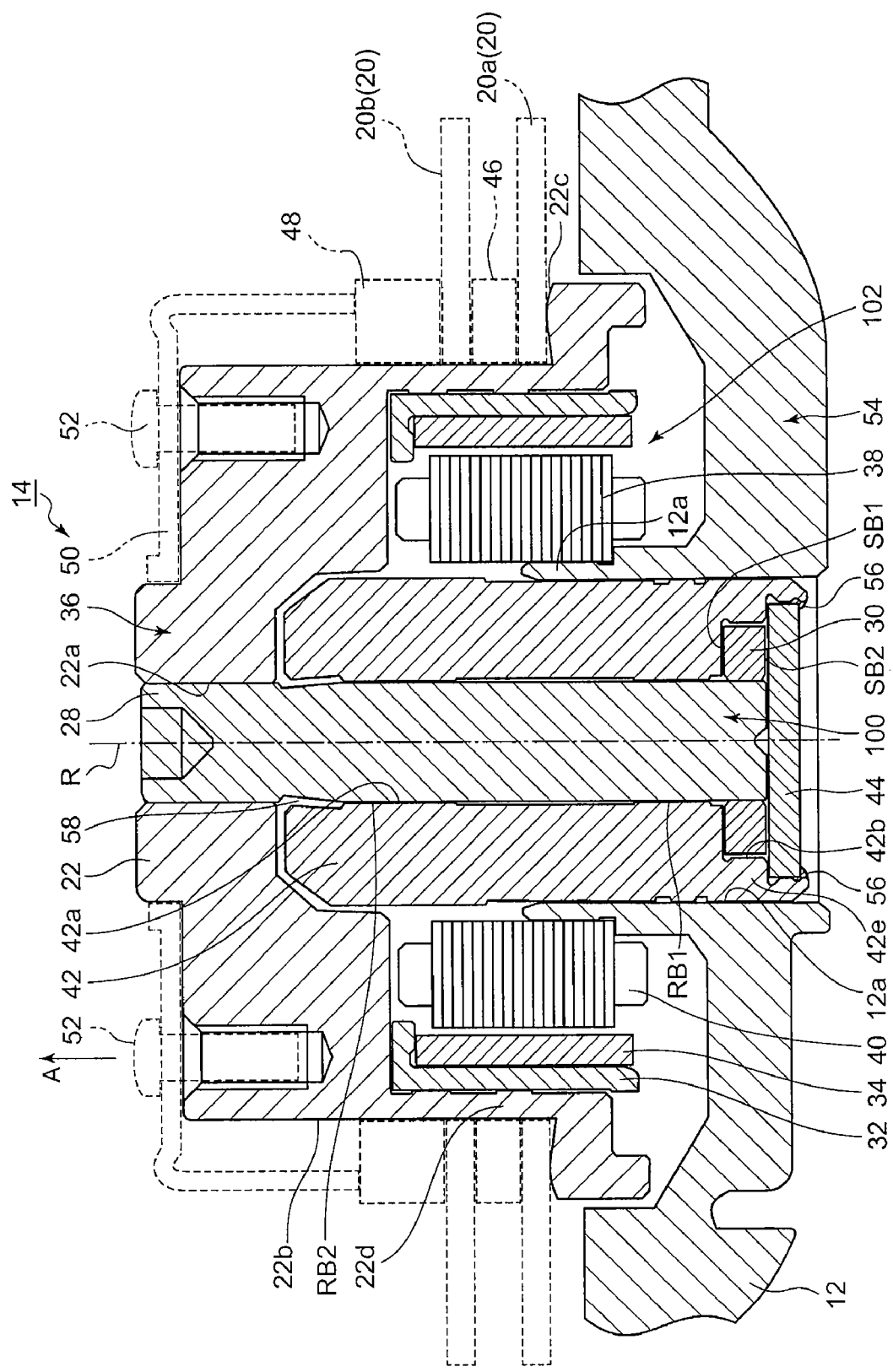
FIG. 2 is a schematic cross-sectional view of a brushless motor in the disk drive device according to the present embodiment.

FIG. 2 is a schematic cross-sectional view of the brushless motor 14 in the disk drive device 10 according to the present embodiment. The brushless motor 14 rotates, for example, two 3.5-inch recording disks 20 with a diameter of approximately 95 mm, which are mounted in the disk drive device. In this case, the diameter of the center hole of each of the two recording disks 20 is 25 mm and the thickness of each of them is 1.27 mm. A rotor 36, which functions as a rotating body, is structured with the brushless motor 14, the approximately cup-shaped hub member 22, a shaft 28, a flange 30, a yoke 32, and a cylindrical magnet 34. Specifically, one end of the shaft 28 is fixed, by a combination of press-fitting and bonding, to an opening 22a provided at the center of the hub member 22. The flange 30 is fixed, in a press-fitted manner, to the other end of the shaft 28. Accordingly, when the brushless motor 14 is rotating, the rotor 36 rotates, as one piece, around the motor rotational axis R.

The hub member 22 is a component having a convex shape, the center of which is the motor rotational axis R. In the brushless motor 14 according to the present embodiment, the two recording disks 20 are mounted on the hub member 22. The center holes of the two recording disks 20a and 20b are fitted around the outer cylindrical surface 22b of the cylinder portion of the hub member 22, which is projected by the arrow A direction in the drawing. In the embodiment, the arrow A direction in the drawing is sometimes referred to as the "upper direction" or the "upper surface side". Of the two recording disks 20, the recording disk 20a is seated on the seating area 22c that is projected, in the radial direction, from the end portion of the outer cylindrical surface 22b of the hub member 22. An annularly-shaped first spacer 46 is arranged between the recording disks 20a and 20b. The first spacer 46 supports the recording disk 20b relative to the seating area 22c. A second spacer 48 is arranged above the recording disk 20b, which is press-fixed by a clamper 50 for fixing the two recording disks 20. The clamper 50 is fixed to the hub member 22 with a plurality of clamp screws 52. In the embodiment, the diameter of the outer cylindrical surface 22b of the hub member 22 is, for example, 25 mm.

The hub member 22 has the cylindrical partition wall portion 22d that is sandwiched by the yoke 32 and the two recording disks 20a and 20b. The yoke 32 has an L-shaped cross-section and is formed of a magnetic material, such as iron. The yoke 32 is fixed, by a combination of bonding and press-fitting, to the inner circumferential surface of the partition wall portion 22d. A plurality of protrusions, against which the yoke 32 is pressed when press-fitted, are formed on the inner circumferential surface of the partition wall portion 22d. By applying an appropriate amount of adhesive to the inner circumferential surface of the partition wall portion 22d and by press-fitting the yoke 32 into the hub member 22, the adhesive is filled between the inner circumferential surface of the partition wall portion 22d and the outer circumferential surface of the yoke 32, thereby acquiring uniform bonding strength.

Further, a cylindrical magnet 34 is fixed, by bonding, to the inner circumferential surface of the yoke 32. The cylindrical magnet 34 is formed of a rare earth material, such as neodium, iron, and boron and is arranged so as to be able to face, in the radial direction, for example, twelve salient poles that are formed on a laminated core 38. The cylindrical magnet 34 is provided with an n-pole drive magnetization in the circumferential direction (where n is an even number greater than or equal to 2). That is, the cylindrical magnet 34 is fixed to the hub member 22 through the yoke 32.

In the brushless motor 14 according to the present embodiment, a stator 54, which functions as a fixed body, is structured with the base member 12, the laminated core 38, a coil 40, a sleeve 42, and a counter plate 44. The stator 54 rotatably supports the rotor 36 when the brushless motor 14 is rotating. The base member 12 can also function as the housing of the disk drive device 10. A cylindrical portion 12a, the center of which is the motor rotational axis R, is provided on the base member 12, and the sleeve 42 is fixed, by bonding, to the inner circumferential surface of the cylindrical portion 12a. The sleeve 42 has a hollow cylinder-shaped housing portion 42a. In addition, a flange housing space portion 42b, which is formed continuously from the sleeve 42 and which rotatably houses the flange 30 that is fixed to the end portion of the shaft 28, is provided on the end portion of the sleeve 42. The flange housing space portion 42b is defined by the flange surrounding wall portion 42e that is formed continuously from the sleeve 42 and outwards in the radial direction of the flange 30. That is, the shaft 28, to which the flange 30 is fixed, is rotatably housed in the sleeve 42 including the housing portion 42a and the flange housing space portion 42b. In addition, the counter plate 44 is fixed, with adhesive 56, to the end surface of the flange surrounding wall portion 42e that defines the flange housing space portion 42b of the sleeve 42. Alternatively, the base member 12 may be formed separately from the housing of the HDD.

Lubricant is filled both between the shaft 28 and the sleeve 42 and between the flange 30 and the counter plate 44, in which the shaft 28 and the flange 30 are included in the rotor 36, and the sleeve 42 and the counter plate 44 are included in the stator 54. A bearing unit 100, which rotatably supports the hub member 22, is structured with the shaft 28, the flange 30, the lubricant, the sleeve 42, and the counter plate 44.

A pair of herringborn-shaped radial dynamic pressure grooves RB1 and RB2, which are vertically spaced apart from each other, are formed on the inner circumferential surface of the sleeve 42. A herringborn-shaped first thrust dynamic pressure groove SB1 is formed on the surface of the flange 30, the surface facing the sleeve, and a herringborn-shaped second thrust dynamic pressure groove SB2 is formed on the surface of the flange 30, the surface facing the counter plate. When the brushless motor 14 is rotating, the shaft 28 and the flange 30 are spaced apart from the surrounding wall surfaces by the dynamic pressure, generated with these dynamic pressure grooves and the lubricant, thereby supporting the rotor 36 in the radial direction and the thrust direction. The radial dynamic pressure grooves RB1 and RB2 may be formed on at least one of the inner wall surface of the sleeve 42 and the outer wall surface of the shaft 28, thereby allowing for the same radial dynamic pressure to be generated. Likewise, the thrust dynamic pressure grooves SB1 and SB2 may be formed on: at least one of the surfaces of the flange 30 and the flange housing space portion 42b, which face each other in the thrust direction; and at least one of the surfaces of the flange 30 and the first surface 44a of the counter plate 44, thereby allowing for the same thrust dynamic pressure to be generated.

A capillary seal portion 58, in which the space between the inner circumferential surface of the sleeve 42 and the outer circumferential surface of the shaft 28 gradually extends upwards, is formed on the open end side of the sleeve 42. The capillary seal portion 58 has a function to prevent the lubricant from leaking out from the filling portion by capillarity.

The laminated core 38 has an annular portion and twelve salient poles that extend outwards, from the annular portion, in the radial direction. The laminated core 38 is formed by laminating, for example, eighteen thin electromagnetic steel plates and by integrating them with laser welding, etc. The coil 40 is wound around each salient pole. A drive magnetic flux is generated along the salient poles by flowing a three-phase drive current with an approximately sine wave shape through the coil 40. The inner circumferential surface of the annular portion of the laminated core 38 is fit, with a clearance fit, in the outer circumferential surface of the cylindrical portion 12a of the base member 12, and is fixed thereto with adhesive, etc. A drive unit 102 is structured with the laminated core 38, coil 40, and the cylindrical magnet 34.

Operations of the brushless motor 14 thus structured will be described. A three-phase drive current is supplied to the coil 40 of the brushless motor 14 in order to rotate the brushless motor 14. Drive magnetic fluxes are generated along the twelve salient poles by flowing a drive current through the coil 40 to provide the cylindrical magnet 34 with torque in the rotational direction, thereby rotating the whole rotor 36.

Figure 3:
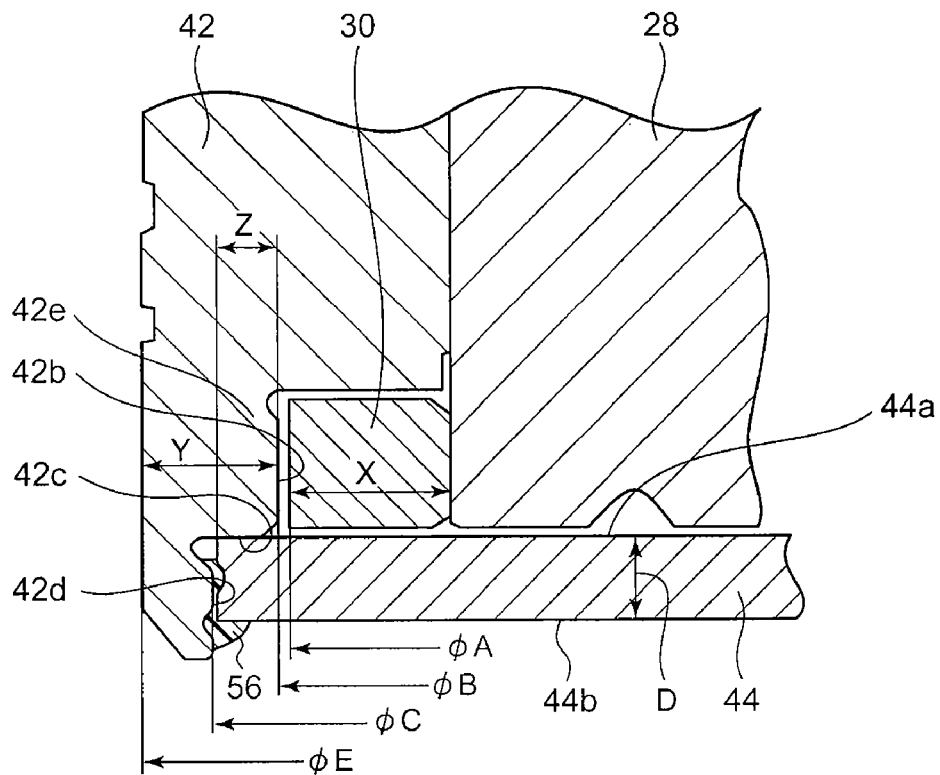
FIG. 3 is an enlarged cross-sectional view of a flange housing space portion and its vicinity in the brushless motor in the disk drive device according to the present embodiment, the flange housing space portion being formed by the end portion of a sleeve and a counter plate.
Figure 4:
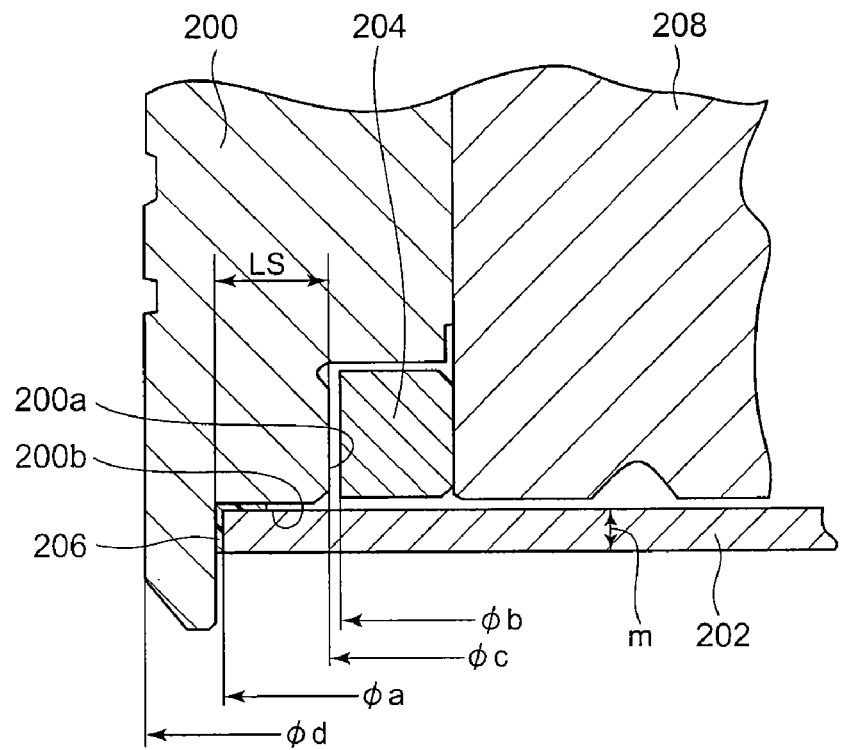
FIG. 4 is an enlarged cross-sectional view of a flange housing space portion and its vicinity in a brushless motor according to a comparative example, the flange housing space portion being formed by the end portion of a sleeve and a counter plate.

Subsequently, the structure for improving the stiffness of the fluid dynamic bearing in the present embodiment will be described using the structures according to the embodiment and a comparative example. FIG. 3 is an enlarged cross-sectional view of the flange housing space portion 42b and its vicinity in the brushless motor 14 in the disk drive device 10 according to the embodiment, the flange housing space portion 42b being formed by the end portion of the sleeve 42 and the counter plate 44. FIG. 4 is an enlarged cross-sectional view of a flange housing space portion 200a and its vicinity in a brushless motor in a disk drive device according to the comparative example, the flange housing space portion 200a being formed by the end portion of a sleeve 200 and a counter plate 202.

At first in the comparative example, the structure of the flange housing space portion 200a for housing a flange 204 and the connection structure of the counter plate 202 will be described. The basic structures of a bearing unit and a drive unit of the brushless motor are the same as those of the brushless motor 14 illustrated in FIG. 2, and hence detailed descriptions with respect thereto will be omitted.

In many structures of conventional brushless motors including the comparative example, the counter plate 202, which closes the flange housing space portion 200a, is fit into the inner circumferential surface of a fitting section of the counter plate 202 in the sleeve 200, after adhesive 206 is applied to the aforementioned inner circumferential surface. Thereafter, the adhesive 206 is hardened. Therefore, while the counter plate 202 is being fit in, a surplus of the adhesive 206 is pushed out by the counter plate 202 and moves to a radial directional bonding area 200b in which the counter plate 202 and the sleeve 200 face each other. In this case, if the distance of the radial directional bonding area 200b is small relative to the flange housing space portion 200a, the adhesive 206 sometimes enters the flange housing space portion 200a. For example, the adhesive 206 sometimes enters the space between the flange 204 and the sleeve 200 and/or the space between the flange 204 and the counter plate 202. Because these spaces are structured to be extremely narrow, the entry of the adhesive 206 may directly lead to a failure in the rotation of the brushless motor.

Hereinafter, an example of specific dimensions of each component in the comparative example will be shown. In FIG. 4, it is assumed that the outer circumferential diameter (hereinafter, referred to as the outer diameter) of a shaft 208 is 4.0 mm, the outer diameter φa of the counter plate 202 is 9.0 mm, and the thickness m of the counter plate is 0.5 mm. Further, it is assumed that the outer diameter φb of the flange 204 is 6.5 mm, the inner circumferential diameter (hereinafter, referred to as the inner diameter) φc of the flange housing space portion 200a is 6.8 mm, and the outer diameter φd of the sleeve 200, which corresponds to the flange housing space portion 200a, is 10.7 mm. Accordingly, the distance LS between the application area, to which the adhesive 206 is applied, and the flange housing space portion 200a is represented by (a−c)/2=1.1 mm.

The present inventors have acquired an experimental result that the stiffness in the thrust direction based on the thrust dynamic pressure, which is generated by rotating a shaft with a flange by which a fluid dynamic bearing is structured, is approximately proportional to the size of the shape of the flange. Accordingly, also in the comparative example, the stiffness in the thrust direction can be enhanced by making the outer diameter φb of the flange 204 large. In this case, if the outer diameter φb of the flange 204 is made large while maintaining the space between the outer diameter of the flange 204 and the inner diameter portion the flange housing space portion 200a at the same value, the inner diameter φc of the flange housing space portion 200a becomes large, accordingly. When the inner diameter φc thereof becomes large, the distance LS of the radial directional bonding area 200b, in which the adhesive 206 is located, becomes short. As stated above, when the distance LS of the radial directional bonding area 200b is small, the possibility that the adhesive 206 may enter the flange housing space portion 200a becomes high, and hence a problem arises in that the brushless motor is more likely to cause a failure in its rotation.

On the other hand, in order to enhance the stiffness in the thrust direction of the fluid dynamic bearing, if the outer diameter φd of the sleeve 200 is made large together with the outer diameter φb of the flange 204 being made large, the distance of the radial directional bonding area 200b can be maintained while also maintaining the space between the outer diameter of the flange 204 and the inner diameter portion of the flange housing space portion 200a. However, the size of the housing of the disk drive device, including the brushless motor, is limited by the mounting space in the apparatus in which the disk drive device is to be mounted, and hence it is difficult that the housing is made large. Accordingly, if the outer diameter φd of the sleeve 200 becomes large, the space for housing the drive unit is decreased, accordingly. That is, the arrangement position of the laminated core is pushed out outwards in the radial direction, thereby making the inner diameter of the laminated core large. As a result, the winding space, in which the coil can be wound, is reduced and the winding number of the coil is decreased. When the winding number of the coil is decreased, the torque is decreased in proportion to the decrease in the winding number, thereby causing the rotation of the rotor to become unstable. Therefore, a problem arises in that normal operations of reading/writing magnetic data may be hampered. In addition, when intending to maintain the required torque, it is necessary to increase the drive current, thereby causing power saving to be hampered, which is not desirable in terms of performance.

Through the consideration of the comparative example, the present inventors have reached the view that, in order to enhance the stiffness in the thrust direction of a fluid dynamic bearing, it is desirable that the outer diameter of a sleeve, which corresponds to a flange housing space portion, is designed to be small so that the inner diameter of a laminated core can be made small while designing the inner diameter of the flange housing space portion to be large.

Accordingly, the flange 30, the sleeve 42, and the counter plate 44 of the brushless motor 14 according to the present embodiment are designed to have the dimensional relationship illustrated in FIG. 3. As the first step, the projected dimension X of the flange 30 is formed to be larger than the wall thickness Y of the flange surrounding wall portion 42e in the radial direction of the flange 30, the flange surrounding wall portion 42e defining the flange housing space portion 42b. As the second step, the thickness D of the counter plate 44 is made larger than the length Z of the area of the first surface 44a of the counter plate 44, the area facing the end portion 42c of the flange surrounding wall portion 42e when sealing the flange housing space portion 42b.

Because the shape of the flange 30 can be increased by adopting the first step structure, the stiffness in the thrust direction of the brushless motor 14 can be improved. Further, by adopting the second step structure, the application area, to which the adhesive 56 is applied, can be distanced from the flange housing space portion 42b as many as the increase in the thickness D of the counter plate 44. That is, the distance, through which the adhesive 56 that is used for fixing, by bonding, the counter plate 44 reaches the flange housing space portion 42b, can be larger, and hence the possibility that the adhesive 56 may enter the flange housing space portion 42b can be reduced.

As illustrated in FIG. 3, the sleeve 42 has, under the flange surrounding wall portion 42e, a fitting section 42d that receives the counter plate 44 in order to seal the flange housing space portion 42b by the counter plate 44. The fitting section 42d can be formed by extending the end outer circumferential portion of the sleeve 42. In the present embodiment, when intending to fix, by bonding, the counter plate 44 to the sleeve 42, the counter plate 44 is at first fit into the fitting section 42d. Subsequently, the adhesive 56 is applied to the second surface 44b of the counter plate 44, which is opposite to the first surface 44a thereof. More specifically, the adhesive 56 is applied, between the counter plate 44 and the fitting section 42d, along the circumferential portion of the counter plate 44, and then the adhesive 56 is hardened. In accordance with the bonding strength of the adhesive 56, the adhesive 56 may be continuously applied along the circumferential portion of the outer edge corner portion so as to cover both the outer edge corner portion on the second surface 44b side of the counter plate 44 and the fitting section 42d, which faces the outer edge corner portion, or may be intermittently applied to the circumferential portion. As stated above, the bonding strength can be easily improved by applying the adhesive 56 so as to cover both the outer edge corner portion of the counter plate 44 and the fitting section 42d, which faces the foregoing outer edge corner portion.

In the aforementioned first step structure and second step structure, the distance between the application area, to which the adhesive 56 is applied, and the flange housing space portion 42b can be made larger as much as the increase in the thickness D of the counter plate 44 by applying the adhesive 56 as stated above. Accordingly, the possibility that the adhesive 56 may enter the flange housing space portion 42b can be effectively reduced. In particular, in the brushless motor 14 that is concurrently provided with the first step structure and second step structure, both the improvement in the stiffness in the thrust direction of the brushless motor 14 and the prevention of the entry of the adhesive 56 can be concurrently realized by applying the adhesive 56 as stated above, thereby contributing to improvement in the quality of the brushless motor 14.

Hereinafter, an example of the specific dimensions of each component in the brushless motor illustrated in FIG. 3 will be shown. When the outer diameter of the shaft 28 is 4.0 mm, the outer diameter $\phi A$ of the flange 30 is extended to 7.8 mm and the inner diameter $\phi B$ of the flange housing space portion 42b is extended to 8.1 mm. On the other hand, it is assumed that the outer diameter $\phi C$ of the counter plate 44 is 9.0 mm and the outer diameter $\phi E$ of the sleeve 42, to which the flange housing space portion 42b corresponds, is 10.7 mm. With this structure, when the radial directional dimension X of the flange is 1.9 mm, it can be ensured that the wall thickness Y of the flange surrounding wall portion 42e of the sleeve 42, which corresponds to the flange housing space portion 42b, is 1.3 mm in the radial direction of the flange. With such a dimensional structure, the stiffness in the thrust direction of the fluid dynamic bearing can be enhanced in comparison with the comparative example. And concurrently, an increase in a drive current and a decrease in torque, occurring due to a decrease in the winding number of the coil 40, can be prevented while maintaining the inner diameter of the laminated core 38 at a small value. As a result, the stable rotation of the brushless motor 14 can also be realized. Further, because an increase of a drive current, due to the decrease in the winding number of the coil 40, can be prevented, power saving of the disk drive device 10 can be maintained.

In the present embodiment, in order to prevent a decrease in the torque while improving the stiffness in the thrust direction, the outer diameter of the flange 30 is made large but that of the sleeve 42 is not made large. That is, the length Z of the area of the first surface 44a of the counter plate 44, the area facing the end portion 42c of the flange surrounding wall portion 42e of the sleeve 42, is made as small as possible. On the other hand, the thickness D of the counter plate 44 is made large in order to make the distance between the application area, to which the adhesive 56 is applied, and the flange housing space portion 42b large. Specifically, the facing dimension Z of the area, in which both the first surface 44a of the counter plate 44 and the end portion 42c of the flange surrounding wall portion 42e of the sleeve 42 face each other, is made small, as represented by $Z=(\phi C-\phi B)/2=(9.0-8.1)/2=0.45$ mm. Further, the thickness D of the counter plate 44 is made large, as represented by D=1.0 mm. As a result, while realizing both the improvement in the stiffness in the thrust direction and the prevention of a decrease in the torque, the distance LS between the application area, to which the adhesive 56 is applied, and the flange housing space portion 42b is determined by LS=Z+D=1.45 mm, making the distance LS larger than the distance LS=1.1 in the comparative example. As a result, the possibility that the adhesive 56 may enter the flange housing space portion 42b can be reduced, thereby contributing to improvement in the reliability of the brushless motor 14.

Figure 5:
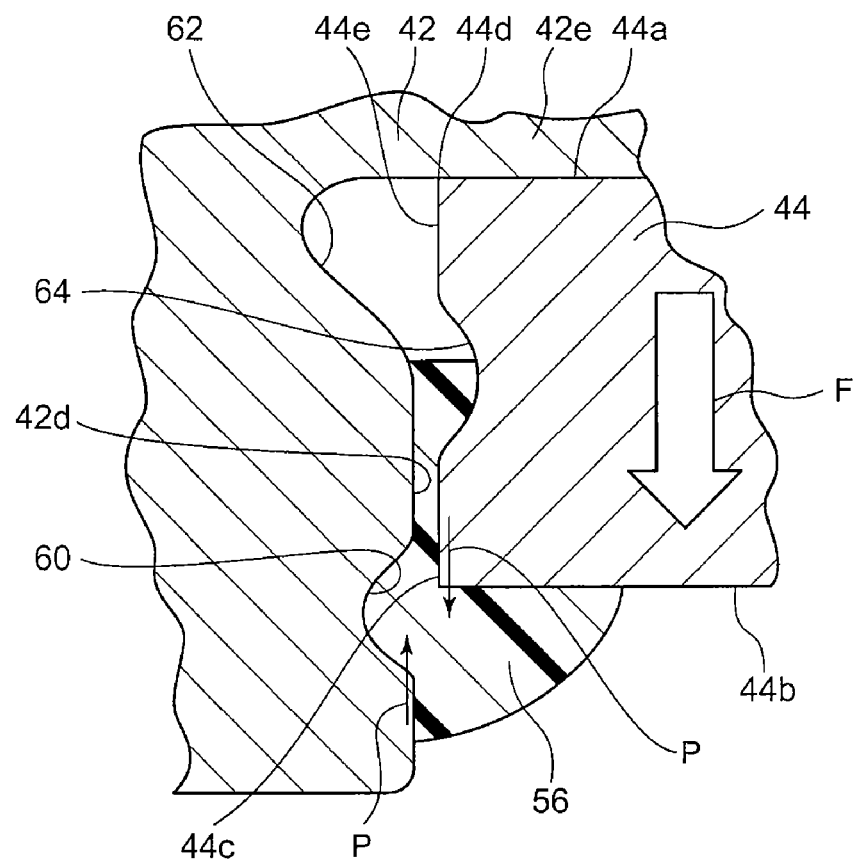
FIG. 5 is an illustrative view illustrating the hardening state of an adhesive, which is applied between the end portion of the sleeve and the counter plate, in the brushless motor in the disk drive device according to the present embodiment.

When intending to further improve the bonding strength of the counter plate 44, it can be considered that an application amount of the adhesive 56 is increased. Contrary to that, the possibility that the adhesive 56 may enter the flange housing space portion 42b becomes high. Accordingly, in the present embodiment, the fitting section 42d has a first concave portion 60, which is hollow in the radial direction of the shaft, between the position that corresponds to the outer edge corner portion 44c on the second surface 44b side of the counter plate 44 and the position that corresponds to the outer edge corner portion 44d on the first surface 44a side of the counter plate 44, as illustrated in FIG. 5. By forming such a first concave portion 60, a larger amount of the adhesive 56, which is larger by the capacity of the first concave portion 60, can be applied, thereby allowing for the bonding strength to be improved. Further, the possibility that the adhesive 56 may enter the flange housing space portion 42b can be reduced even when a larger amount of the adhesive 56 is applied in comparison with the case where the first concave portion 60 is not present.

When an impact is applied to the disk drive device 10 due to fall, etc., the shaft 28 collide against the counter plate 44, and hence the counter plate 44 receives impact stress F in the direction where the counter plate 44 may fall off from the fitting section 42d. In the present embodiment, the counter plate 44 is designed to be fit into the fitting section 42d by matching the outer edge corner portion 44c of the second surface 44b of the counter plate 44 to the hollow area of the first concave portion 60, as illustrated in FIG. 5. In this case, it is desirable that the center of the hollow area of the first concave portion 60 is designed to match the outer edge corner portion 44c. With such an arrangement, the adhesive 56 covers the second surface 44b of the counter plate 44 and the first concave portion 60, and hence the bonding strength can be improved by a larger amount of the adhesive 56 supporting and fixing the second surface 44b in comparison with the case where the first concave portion 60 does not match the second surface 44b. As a result, even when an impact is applied to the disk drive device 10, the impact can be absorbed by the adhesive 56, and hence the effect of suppressing the counter plate 44 from falling off can be improved.

Figure 6:
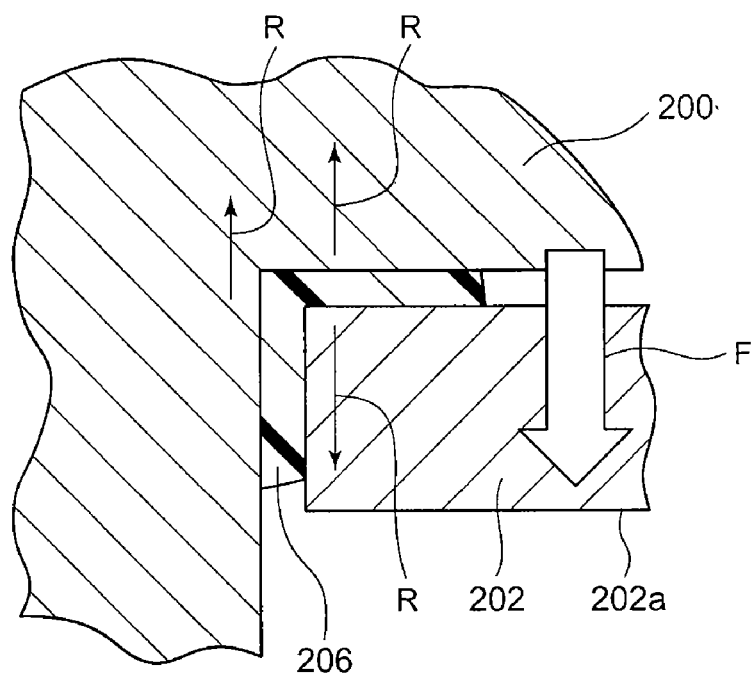
FIG. 6 is an illustrative view illustrating a hardening state of the adhesive, which is applied between the end portion of the sleeve and counter plate, in the brushless motor according to the comparative example.

FIG. 6 illustrates a comparative example of the bonding of a counter plate. In this example, a hardened adhesive 206 does not cover the second surface 202a of the counter plate 202. As stated above, the impact stress F acts when an impact is applied to the disk drive device. The impact stress F in this case acts on the bonding area of the adhesive 206 as either shear stress R or tension stress. When part of the bonding area is peeled off by such shear stress R or tension stress, the stress is concentrated in the remaining bonding area. Thereby, the peeling spreads in a chain reaction, which leads to decreased bonding strength.

On the other hand, when the hardened adhesive 56 covers both the second surface 44*b* of the counter plate 44 and the first concave portion 60 as in the present embodiment illustrated in FIG. 5, the impact stress F acts on the bonding area as compression stress as illustrated by arrow P. It is difficult for such compression stress to induce the continuous peeling of the adhesive 56, and hence it becomes possible that the bonding strength of the counter plate 44 can be maintained at a higher value in comparison with that in the comparative example. As a result, it becomes possible that the adhesive 56 is applied only to the first concave portion 60 and the vicinity of the second surface 44*b*. Thereby, the possibility that the adhesive 56 may enter the flange housing space portion 42*b* can be further reduced.

In addition, in the present embodiment, a second concave portion 62, which is hollow in the radial direction of the shaft 28 on the first surface 44*a* side of the counter plate 44, is provided in the fitting section 42*d* of the sleeve 42, as illustrated in FIG. 5. In the second concave portion 62, an excessive amount of the adhesive 56 can be trapped, and hence the possibility that the adhesive 56 may enter the flange housing space portion 42*b* can be further reduced.

In the present embodiment, a plate concave portion 64 can also be provided on the side surface 44*e* of the counter plate 44, as illustrated in FIG. 5. In this case, an excessive amount of the adhesive 56 can also be trapped in the hollow area of the plate concave portion 64, and hence the effect of suppressing the entry of the adhesive 56 into the flange housing space portion 42*b* can be further enhanced. The retention of the adhesive 56 also in the plate concave portion 64 can contribute to the improvement in the bonding strength of the counter plate 44, and hence the effect of preventing the counter plate 44 from falling off, occurring when an impact is applied to the disk drive device 10, can be enhanced. Also, because the impact stress F acts on the area as compression stress P, the effect of suppressing the peeling of the adhesive 56 from spreading can be acquired.

Figure 7:
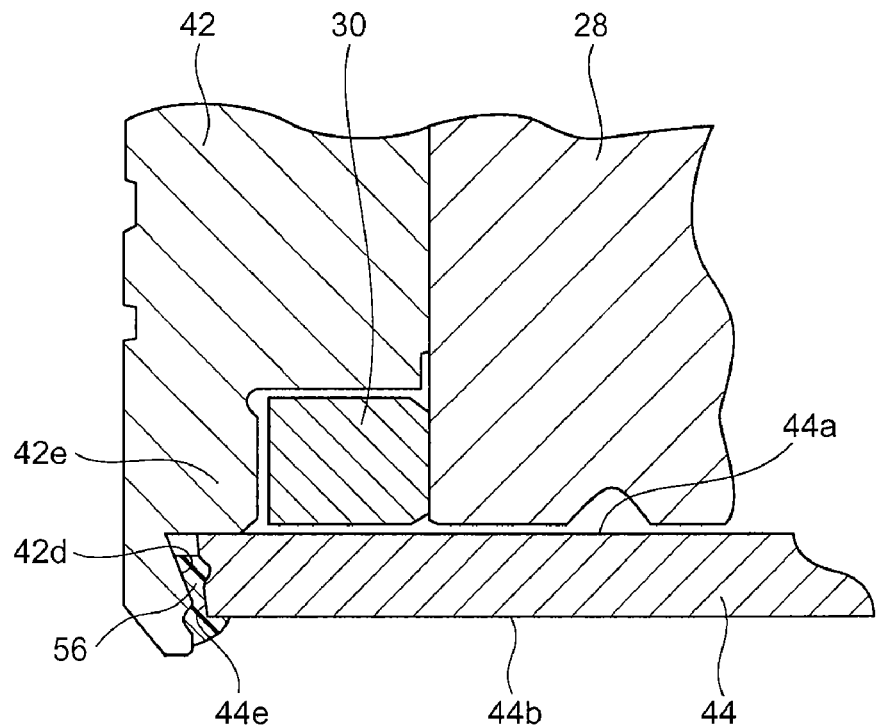
FIG. 7 is a partial cross-sectional view illustrating another structure of the disk drive device according to the present embodiment.

FIG. 7 is a partial cross-sectional view illustrating another structure of the disk drive device 10 according to the present embodiment. In this example, both the shape of the side surface 44*e* of the counter plate 44 and the shape of the fitting section 42*d* of the sleeve 42 are different from those in the structure illustrated in FIG. 3, etc. In this variation, a slope is provided on the side surface 44*e* of the counter plate 44, as illustrated in FIG. 7. Specifically, the counter plate 44 on the second surface 44*b* side is made smaller than that on the first surface 44*a* side. In the present embodiment, because the counter plate 44 is disk-shaped, the diameter on the second surface 44*b* side is made smaller than that on the first surface 44*a* side. In addition, the fitting section 42*d* of the sleeve 42, in which the counter plate 44 is to be fitted, is designed to grow in dimension toward the flange surrounding wall portion 42*e* that defines the flange housing space portion 42*b*. In the present embodiment, because the sleeve 42 is cylinder-shaped, the fitting section 42*d* is designed to extend toward the flange surrounding wall portion 42*e*. With such a shape, the space between the fitting section 42*d* and the side surface 44*e* of the counter plate 44 can be extended. In the case where the counter plate 44 on the second surface 44*b* side is made smaller, or in the case where the fitting section 42*d* of the sleeve 42 is designed to grow in dimension toward the flange surrounding wall portion 42*e*, the capability of trapping an excessive amount of the adhesive 56 can be enhanced, and the possibility that the adhesive 56 may enter the flange housing space portion 42*b* can be further reduced. Also, it becomes possible that an amount of the adhesive 56 for bonding the sleeve 42 and the counter plate 44 together is increased, thereby easily improving the bonding strength. Further, because the adhesive 56 is located in the state of being sandwiched by the slope, the stress, which acts on the adhesive, becomes compression stress when an impact is applied to the disk drive device 10. Thereby, even when the impact stress F is applied as stated above, the effect of suppressing the peeling of the bonding surface from spreading can be acquired. Making the diameter on the second surface 44*b* side of the counter plate 44 smaller and growing in dimension of the fitting section 42*d* of the sleeve 42 toward the flange surrounding wall portion 42*e*, may be performed alone or in combination. The aforementioned effects can be acquired in either case. When the two are performed in combination, it is desirable that an angle at which the fitting section 42*d* grows in dimension is made larger than that at which the diameter is made smaller, as illustrated in FIG. 7.

Figure 8:
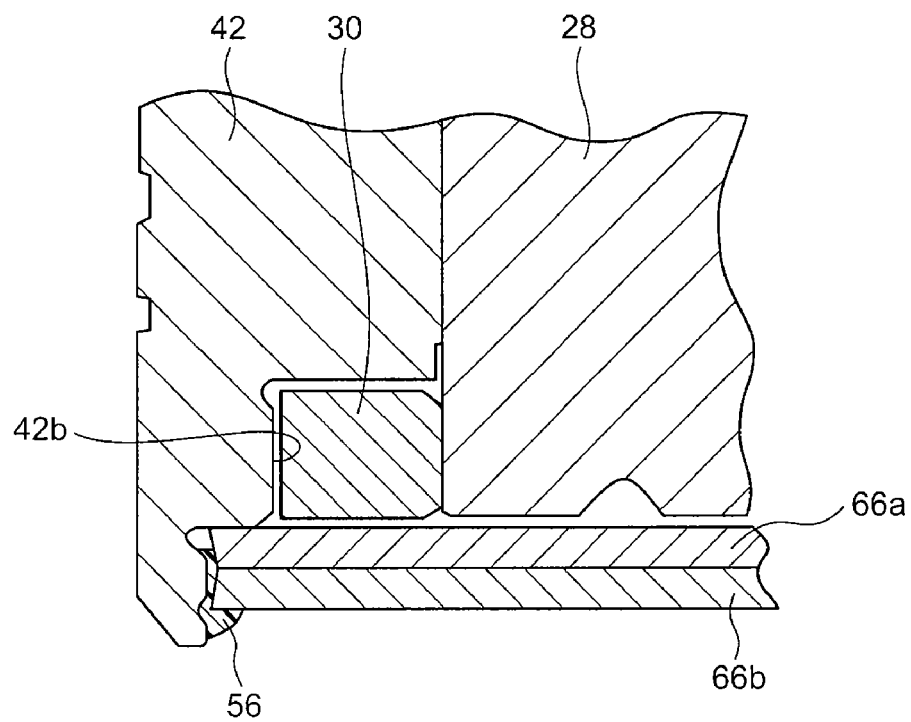
FIG. 8 is a partial cross-sectional view illustrating another structure of the disk drive device according to the present embodiment.

FIG. 8 is a partial cross-sectional view illustrating still another structure of the disk drive device 10 according to the present embodiment. In this example, the structure of the counter plate is different from that illustrated in FIG. 7, etc. In this example, the same thickness as that of the counter plate 44, which is illustrated in FIG. 7, is realized by two counter plates 66*a* and 66*b*. For example, the counter plates 66*a* and 66*b*, each of which has a thickness of 0.5 mm, are laminated one on another such that the total thickness thereof becomes 1.0 mm, which is the same as the thickness of the counter plate 44. As a result, the distance between the application area, to which the adhesive 56 is applied, and the flange housing space portion 42*b* can be increased in the same way as in the example illustrated in FIG. 3, thereby the effect of suppressing the entry of the adhesive 56 into the flange housing space portion 42*b* can be acquired. Further, by providing slopes, which are tilted in directions opposite to each other, on the side surfaces of the counter plates 66*a* and 66*b*, the hollow area, which exerts the same function as the plate concave portion 64, can be easily formed. The counter plates 66*a* and 66*b* can be bonded with an adhesive, laser welding or a combination of the two.

Figure 9:
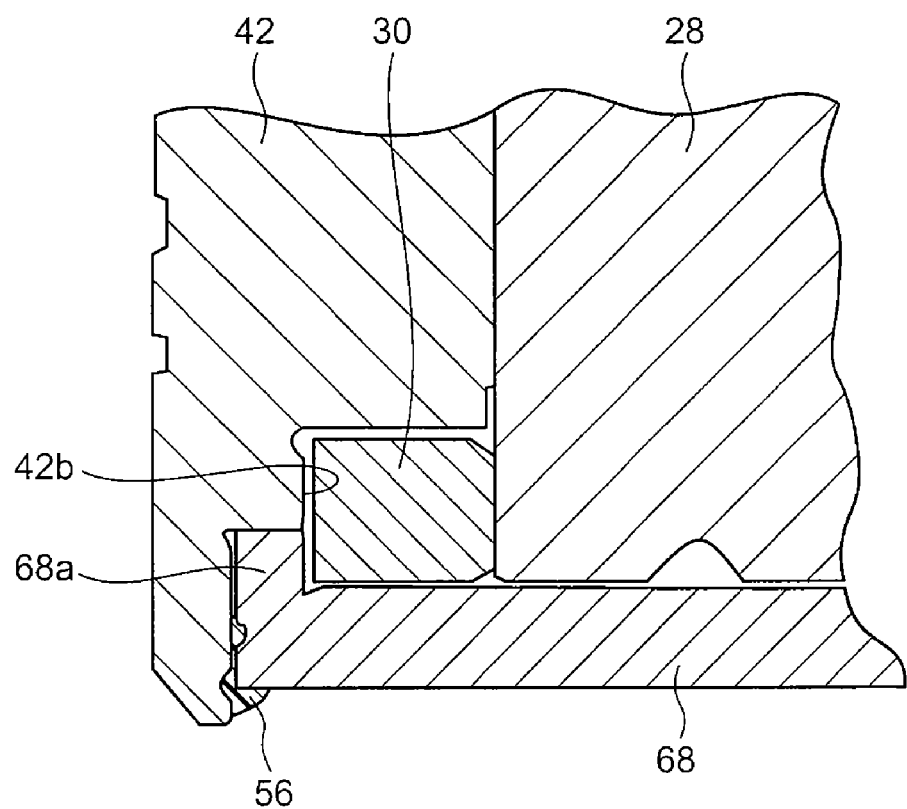
FIG. 9 is a partial cross-sectional view illustrating another structure of the disk drive device according to the present embodiment.

FIG. 9 is a partial cross-sectional view illustrating still another structure of the disk drive device 10 according to the present embodiment. In this example, the shape of the counter plate is different from that in the structure illustrated in FIG. 3, etc. In this example, the circumferential wall portion 68*a*, which extends in the axial direction of the shaft 28, is provided on the outer circumferential portion of the counter plate 68. The inner circumferential surface of the circumferential wall portion 68*a* is designed to be part of the flange housing space portion 42*b*. Also in this structure, the distance between the application area, to which the adhesive 56 is applied, and the flange housing space portion 42*b* can be increased in the same way as in the example illustrated in FIG. 3, and hence the effect of suppressing the entry of the adhesive 56 into the flange housing space portion 42*b* can be acquired.

When intending to normally fix, by bonding, a counter plate to the fitting section of a sleeve, a thermosetting liquid adhesive is usually used. In this case, the liquid adhesive sometimes flows and spreads before being placed in a heating oven or before being hardened in a heating oven. Accordingly, a liquid adhesive with a low viscosity cannot be used, thereby causing the disadvantage that it takes a long time to uniformly apply the adhesive to the outer circumference of the counter plate. Therefore, the adhesive 56 that is used in the present embodiment is selected from adhesives in which ultraviolet radiation and heating can be adopted in combination. That is, the liquid adhesive 56 is at first applied to the required bonding areas. Subsequently, the surface of the adhesive 56 is hardened by immediately radiating ultraviolet rays. A period of radiating ultraviolet rays can be appropriately determined by experiment, etc.; however, once the surface of the adhesive 56 is hardened, the flow of the adhesive can be prevented even when the inside of the adhesive is not yet hardened. Accordingly, a short period of radiation is satisfactory. Thereafter, the disk drive device is placed in a heating oven to harden the inside of the adhesive in accordance with the production method, such as with a batch process or continuous process. As a result, the liquid adhesive 56, with a low viscosity, can be used, thereby contributing to the reduction in the work time or labor involved.

As such adhesives 56, adhesive whose major component is, for example, epoxy-acrylic hybrid adhesive is preferred. In this adhesive, the surface thereof can be hardened in a short time by radiating ultraviolet rays with a wavelength of 200 to 400 nm. By preventing the flow of the adhesive, the work time and efforts can be reduced. Further, the inside of the adhesive is hardened by heating to secure the bonding strength. In addition, after the surface is hardened with ultraviolet rays, it is no longer necessary to take measures for the gas from the inside of the adhesive 56 because the volatilization of the adhesive components from the inside thereof can be suppressed, thereby providing an advantage in terms of the production and the quality. In addition, by maintaining the viscosity of the liquid adhesive 56 at, for example, 16 Pa·s or less at 25 C, the adhesive can be easily and uniformly applied to the bonding position of the counter plate 44, thereby allowing for the required work time to be sufficiently reduced. Also, by maintaining the viscosity of the adhesive 56 at 4 Pa·s or more, excessive spread of the liquid adhesive 56 can be prevented. Accordingly, it is preferable in terms of the work and the quality that the viscosity of the adhesive 56 is maintained within a range of 4 Pa·s to 16 Pa·s (inclusive).

As stated above, in recent years, there has been a strong demand for mounting disk drive devices 10 in mobile devices, and hence it has been requested that the disk drive devices improve their impact resistance when falling. An experimental result has been acquired that, for example, in the comparative examples illustrated in FIGS. 4 and 6, there exists a disk drive device in which the bonding strength of the counter plate 202 is approximately 600 N, or a disk drive device whose resistible impact is approximately 200 G when an impact is applied for a short period of 2 ms. As stated above, while the disk drive devices 10 are widely mounted in mobile devices, there are cases where an impact, which is greater than or equal to 300 G, is applied thereto, and therefore there is a demand for measures to deal with the impact.

A result has been acquired that, according to the structure and the bonding structure of the counter plate 44 in the disk drive device 10 of the present embodiment, the bonding strength of the counter plate 44 can be made greater than or equal to 1000 N. For example, it is designed, as illustrated in FIG. 3, that the outer diameter of the shaft is 4.0 mm, the outer diameter φA of the flange 30 is 7.8 mm, the inner diameter φB of the flange housing space portion 42b is 8.1 mm, the outer diameter φC of the counter plate 44 is 9.0 mm, the outer diameter φE of the sleeve 42 is 10.7 mm, and the thickness D of the counter plate 44 is 1.0 mm. In addition, as illustrated in FIG. 5, the first concave portion 60 is provided on the open side of the inner cylindrical surface of the fitting section 42d of the counter plate 44 of the sleeve 42, and the adhesive 56 is applied so as to cover the first concave portion 60 and the second surface 44b of the counter plate 44. In this case, the outer edge corner portion 44c on the second surface 44b side of the counter plate 44 is arranged and adhered so as to be located at the center of the hollow area of the first concave portion 60. It has been confirmed, through experiment, that, by adjusting the amount of the adhesive 56 in this case, the bonding strength of the counter plate 44 can be improved to 1000 N or more while preventing the entry of the adhesive 56 into the flange housing space portion 42b. In this structure, the required amount of the adhesive 56 can be determined through experiment. It has been confirmed that, in the disk drive device 10 in which the bonding strength of the counter plate 44 is greater than or equal to 1000 N as stated above, the bonding area of the counter plate 44 is not damaged even when an impact of 350 G is applied for a short period of 2 ms.

When the bonding strength of the counter plate 44 is made excessively large, a larger amount of the adhesive 56 is to be used, and it takes a longer time to harden the adhesive 56 thereby, it is not preferred also in terms of resource saving. Accordingly, it is advantageous, in terms of the work efficiency, that the bonding strength of the counter plate 44 be made smaller than or equal to 3000 N.

In each aforementioned embodiment, a so-called outer-rotor brushless motor has been described, in which the cylindrical magnet 34 is located outside the laminated core 38. However, even in a so-called inner-rotor brushless motor in which, for example, a magnet is located inside a laminated core, similar effects as in the present embodiment can be acquired.

In each aforementioned embodiment, the case where the laminated core is used has been described; however, the core may not be a laminated core. In each embodiment, the structure of the brushless motor 14 for HDDs has been described; however, even in a disk drive motor, which is mounted in an optical recording and reproducing device, such as CD device or DVD device, the technique of the present embodiment can be applied and similar effects as in the present embodiment can be acquired.

The present invention shall not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A disk drive device comprising:
 a base member;
 a bearing unit arranged on the base member and configured to rotatably support a recording disk relative to the base member; and
 a drive unit configured to rotationally drive the recording disk to be supported by the bearing unit, wherein the bearing unit includes:
 a shaft to be the center of the rotation;
 a sleeve having a housing portion for housing the shaft and configured to allow relative rotation, with the shaft as the axis;
 a radial space portion defined by both the inner wall surface of the housing portion of the sleeve and the outer wall surface of the shaft;
 a radial dynamic pressure groove formed on at least one of the inner wall surface of the sleeve and the outer wall surface of the shaft so as to generate radial dynamic pressure, the two wall surfaces defining the radial space portion;
 a flange projected in the radial direction of the shaft and configured to rotate integrally with the shaft;

a flange housing space portion defined by the flange surrounding wall portion and configured to rotatably house the flange, the flange surrounding wall portion being formed continuously from the sleeve and outwards in the radial direction of the flange;

a counter plate structured with both a first surface, which faces an end surface in the axial direction of the flange and seals the flange housing space portion, and a second surface that is opposite to the first surface;

a thrust dynamic pressure groove formed on both of at least one of surfaces of the flange and the flange housing space portion, which face each other in the thrust direction, and at least one of surfaces of the flange and the first surface of the counter plate, and configured to generate thrust dynamic pressure; and lubricant that is filled in the radial space portion and the flange housing space portion, wherein a projected dimension of the flange is larger than a wall thickness of the flange surrounding wall portion in the radial direction of the flange, wherein the sleeve has a fitting section that receives the counter plate in order to seal the flange housing space portion by the counter plate, wherein the fitting section has a first concave portion, which is hollow in the radial direction of the shaft so as to include a part of an area between the position that corresponds to the outer edge corner portion on the second surface side of the counter plate and the position that corresponds to the outer edge corner portion on the first surface side of the counter plate, wherein the counter plate is fit into and fixed in the fitting section such that the outer edge corner portion on the second surface side matches the hollow area of the first concave portion, and wherein adhesive is applied, between the counter plate and the fitting section, along the circumferential portion of the counter plate.

2. The disk drive device according to claim 1, wherein the thickness of the counter plate is larger than the length of the area of the first surface of the counter plate, the area facing an end portion of the flange surrounding wall portion when the counter plate is fitted into the flange housing space portion.

3. The disk drive device according to claim 1, wherein the adhesive is applied along the circumferential portion of the outer edge corner portion so as to cover both the outer edge corner portion on the second surface side of the counter plate and the fitting section that faces the outer edge corner portion.

4. The disk drive device according to claim 1, wherein the fitting section has a second concave portion, which is hollow in the radial direction of the shaft, at the position closer to the outer edge corner portion on the first surface side than the first concave portion.

5. The disk drive device according to claim 1, wherein a plate concave portion, which is hollow in the radial direction of the shaft, is provided on the side surface of the counter plate.

6. The disk drive device according to claim 1, wherein the counter plate on the second surface side is made smaller than the counter plate on the first surface side.

7. The disk drive device according to claim 1, wherein a diameter of the fitting section is progressively larger toward the flange housing space portion.

8. The disk drive device according to claim 1, wherein the counter plate is provided, on its outer circumferential portion, with a circumferential wall portion that extends in the axial direction of the shaft, and the inner circumferential surface of the circumferential wall portion is designed to be part of the flange housing space portion.

9. The disk drive device according to claim 1, wherein a diameter of the fitting section is progressively larger toward the flange housing space portion, and the counter plate on the second surface side is made smaller than the counter plate on the first surface side, and an angle at which the fitting section grows in dimension in the axial direction of the shaft is larger than that at which the counter plate is made smaller in the axial direction of the shaft.

10. A disk drive device comprising:

a base member;

a bearing unit arranged on the base member and configured to rotatably support a recording disk relative to the base member; and a drive unit configured to rotationally drive the recording disk to be supported by the bearing unit, wherein the bearing unit includes:

a shaft to be the center of the rotation;

a sleeve having a housing portion for housing the shaft and configured to allow relative rotation, with the shaft as the axis;

a radial space portion defined by both the inner wall surface of the housing portion of the sleeve and the outer wall surface of the shaft;

a radial dynamic pressure groove formed on at least one of the inner wall surface of the sleeve and the outer wall surface of the shaft so as to generate radial dynamic pressure, the two wall surfaces defining the radial space portion;

a flange projected in the radial direction of the shaft and configured to rotate integrally with the shaft;

a flange housing space portion defined by the flange surrounding wall portion and configured to rotatably house the flange, the flange surrounding wall portion being formed continuously from the sleeve and outwards in the radial direction of the flange;

a counter plate structured with both a first surface, which faces an end surface in the axial direction of the flange and seals the flange housing space portion, and a second surface that is opposite to the first surface;

a thrust dynamic pressure groove formed on both of at least one of surfaces of the flange and the flange housing space portion, which face each other in the thrust direction, and at least one of surfaces of the flange and the first surface of the counter plate, and configured to generate thrust dynamic pressure; and lubricant that is filled in the radial space portion and the flange housing space portion, wherein the sleeve has a fitting section that receives the counter plate in order to seal the flange housing space portion by the counter plate, wherein the fitting section has a first concave portion, which is hollow in the radial direction of the shaft so as to include a part of an area between the position that corresponds to the outer edge corner portion on the second surface side of the counter plate and the position that corresponds to the outer edge corner portion on the first surface side of the counter plate, wherein the counter plate is fit into and fixed in the fitting section such that the outer edge corner portion on the second surface side matches the hollow area of the first concave portion, and wherein adhesive applied, between the counter plate and the fitting section, along the circumferential portion of the counter plate.

11. The disk drive device according to claim 10, wherein the thickness of the counter plate is larger than the length of the area of the first surface of the counter plate, the area facing an end portion of the flange surrounding wall portion when the counter plate is fitted into the flange housing space portion.

12. The disk drive device according to claim 10, wherein the adhesive is applied along the circumferential portion of the outer edge corner portion so as to cover both the outer edge corner portion on the second surface side of the counter plate and the fitting section that faces the outer edge corner portion.

13. The disk drive device according to claim 10, wherein a plate concave portion, which is hollow in the radial direction of the shaft, is provided on the side surface of the counter plate.

14. The disk drive device according to 10, wherein the counter plate on the second surface side is made smaller than the counter plate on the first surface side.

15. The disk drive device according to claim 10, wherein a diameter of the fitting section is progressively larger toward the flange housing space portion.

16. A method of manufacturing a disk drive device, the disk drive comprising:
 a base member;
 a bearing unit arranged on the base member and configured to rotatably support a recording disk relative to the base member; and
 a drive unit configured to rotationally drive the recording disk to be supported by the bearing unit, wherein the bearing unit includes:
 a shaft to be the center of the rotation;
 a sleeve having a housing portion for housing the shaft and configured to allow relative rotation, with the shaft as the axis;
 a radial space portion defined by both the inner wall surface of the housing portion of the sleeve and the outer wall surface of the shaft;
 a radial dynamic pressure groove formed on at least one of the inner wall surface of the sleeve and the outer wall surface of the shaft so as to generate radial dynamic pressure, the two wall surfaces defining the radial space portion;
 a flange projected in the radial direction of the shaft and configured to rotate integrally with the shaft;
 a flange housing space portion defined by the flange surrounding wall portion and configured to rotatably house the flange, the flange surrounding wall portion being formed continuously from the sleeve and outwards in the radial direction of the flange;
 a counter plate structured with both a first surface, which faces an end surface in the axial direction of the flange and seals the flange housing space portion, and a second surface that is opposite to the first surface;
 a thrust dynamic pressure groove formed on both of at least one of surfaces of the flange and the flange housing space portion, which face each other in the thrust direction, and at least one of surfaces of the flange and the first surface of the counter plate, and configured to generate thrust dynamic pressure; and
 lubricant that is filled in the radial space portion and the flange housing space portion,
 wherein the sleeve has a fitting section that receives the counter plate in order to seal the flange housing space portion by the counter plate,
 wherein the fitting section has a first concave portion, which is hollow in the radial direction of the shaft so as to include a part of an area between the position that corresponds to the outer edge corner portion on the second surface side of the counter plate and the position that corresponds to the outer edge corner portion on the first surface side of the counter plate,
 wherein the counter plate is fit into and fixed in the fitting section such that the outer edge corner portion on the second surface side matches the hollow area of the first concave portion,
 wherein adhesive is applied, between the counter plate and the fitting section, along the circumferential portion of the counter plate, and
 wherein the adhesive is applied to the second surface of the counter plate after the counter plate is fit into the fitting section.

17. The disk drive device according to claim 16, wherein the fitting section has a second concave portion, which is hollow in the radial direction of the shaft, at the position closer to the outer edge corner portion on the first surface side than the first concave portion.

* * * * *